United States Patent
Bird, Jr.

(10) Patent No.: US 10,327,430 B2
(45) Date of Patent: Jun. 25, 2019

(54) FISHING LINE DISPENSING APPARATUSES AND METHODS OF USE

(71) Applicant: Roddie I Bird, Jr., Roosevelt, UT (US)

(72) Inventor: Roddie I Bird, Jr., Roosevelt, UT (US)

(73) Assignee: Roddie I. Bird, Jr., Roosevelt, UT (US)

( * ) Notice: Subject to any disclaimer, the term of this patent is extended or adjusted under 35 U.S.C. 154(b) by 141 days.

(21) Appl. No.: 15/470,723

(22) Filed: Mar. 27, 2017

(65) Prior Publication Data
US 2018/0271077 A1 Sep. 27, 2018

(51) Int. Cl.
| | | |
|---|---|---|
| *A01K 89/01* | (2006.01) | |
| *A01K 89/00* | (2006.01) | |
| *B65H 75/32* | (2006.01) | |
| *B65H 75/40* | (2006.01) | |
| *B65H 75/44* | (2006.01) | |
| *A01K 97/06* | (2006.01) | |

(52) U.S. Cl.
CPC ............ *A01K 89/003* (2013.01); *A01K 97/06* (2013.01); *B65H 75/32* (2013.01); *B65H 75/40* (2013.01); *B65H 75/4402* (2013.01); *B65H 2701/355* (2013.01)

(58) Field of Classification Search
CPC ...... A01K 89/003; A01K 97/06; B65H 75/40; B65H 75/406; B65H 75/4402; B65H 75/32; B65H 2701/335
See application file for complete search history.

(56) References Cited

U.S. PATENT DOCUMENTS

| | | | | |
|---|---|---|---|---|
| 3,026,059 A * | 3/1962 | Dennler | ............... | A01K 89/003 242/396.9 |
| 3,261,569 A * | 7/1966 | Bedell | ................. | A01K 89/003 24/369 |
| 3,399,847 A * | 9/1968 | Slate | ................... | A01K 89/003 206/395 |
| 3,951,354 A * | 4/1976 | Bagby | ................ | A01K 89/003 242/129.8 |
| 3,957,224 A * | 5/1976 | Smith | ................. | A01K 89/003 242/129.6 |
| 4,787,168 A * | 11/1988 | Benit | ................... | A01K 89/003 242/588.6 |
| 6,671,993 B1 * | 1/2004 | Routt | .................. | A01K 89/003 43/25 |
| 9,314,006 B2 * | 4/2016 | McLeod | ................ | A01K 89/00 |
| 2003/0168545 A1 * | 9/2003 | Yu | .......................... | H02G 11/02 242/388.1 |
| 2004/0031877 A1 * | 2/2004 | Smith, Jr. | ............ | A01K 89/003 242/588.4 |

(Continued)

*Primary Examiner* — Emmanuel M Marcelo
(74) *Attorney, Agent, or Firm* — Workman Nydegger (57) ABSTRACT

Fishing line dispensing apparatuses for loading fishing line onto a reel, can include a base operable to hold a spool of fishing line, a cap detachably associated with at least a portion of the base, and one or more securing elements coupled to the base. The securing elements can be operable to releasably secure the base to a shaft of a fishing rod. The base of a fishing line dispensing apparatus can additionally include a spool retention surface disposed at a bottom end of the base and a sidewall connected to and extending in a substantially orthogonal direction away from the spool retention surface.

20 Claims, 5 Drawing Sheets

(56) References Cited

U.S. PATENT DOCUMENTS

| | | | | |
|---|---|---|---|---|
| 2008/0203207 A1* | 8/2008 | Krauland | ............. | A01K 89/003 242/287 |
| 2010/0325935 A1* | 12/2010 | Chen | .................... | A01K 89/003 43/25 |
| 2013/0264407 A1* | 10/2013 | McLeod | ................. | A01K 97/06 242/310 |
| 2015/0173335 A1* | 6/2015 | Wang | .................... | A01K 89/003 242/590 |
| 2017/0142948 A1* | 5/2017 | Moreno | ............... | A01K 89/003 |

* cited by examiner

FISHING LINE DISPENSING APPARATUSES AND METHODS OF USE

BACKGROUND

1. Technical Field

This disclosure generally relates to systems and devices for use in angling and methods for implementing the same. More specifically, the present disclosure relates to apparatuses for dispensing fishing line onto a reel.

2. Related Technology

Angling has evolved from primarily being a method of providing food to an activity for sport or recreation, though the day's catch can still end up in the frying pan. Fishing is a sport that brings together people from all generations and walks of life and often acts as a medium for promoting quality time between individuals and for spawning fond memories. The tales of reeling in the trophy lunker or even of the one who got away are the modern-day legends reiterated at family outings and among friends.

Fishing equipment has advanced from the days of whittled spears and a hooked string on a stick, to a variety of specialty and all-purpose gear. For example, rods sporting a spectrum of action and power can be customized with any number or type of reel. For example, the spincast reel is often favored for the beginner angler for its ease of use and simple design. On the other end of the spectrum, a baitcasting reel is often preferred by experienced anglers due to its superb casting accuracy, though it can be difficult to master the rotating spool and has a tendency to tangle the inexperienced angler in a nasty nest of line. Nevertheless, a baitcasting reel is favored for situations calling for heavier line, such as deep sea fishing. Perhaps the most popular reel for sport and recreational fishing—the spinning reel—is easier to use than the baitcasting reel and more accurate than the spincast.

Regardless of the reel chosen, every angler is faced with the inevitability of loading the reel's spool with line. This seemingly simple task, however, is often fraught with difficulties. Line is often loaded onto a reel from a store of line found on a supplemental spool. A loose end of line is attached to the reel, and the reel is then engaged in a similar fashion to reeling in a cast. This pulls the line from the supplemental spool onto the reel's corresponding spool. When fishing, however, an angler typically uses two hands to reel in a cast—a first hand to balance the pole a second hand to reel in the line. Because the user typically engages both hands while reeling line, it can be problematic to simultaneously handle a supplemental spool while also ensuring the line is properly fed onto the destination spool.

To solve this problem, many anglers rely on an extra pair of hands to load a reel: a first person guides and reels line onto the destination spool while the other monitors dispensing of the line from a supplemental spool. This is, at best, a waste of manpower, and sometimes the line on a reel needs to be changed in the field where the angler is alone or far away from the nearest available assistant. In the absence of a helping hand, it can be difficult to accomplish such a feat. Even if an individual manages to perform the task alone, it generally requires extraordinary dexterity and an ideal location for performing the act to limit the possibility the supplemental spool is lost (e.g., falls into the water) or damaged and to ensure the reel is loaded correctly. If improperly loaded, the line can twist or tangle and affect casting length, accuracy, and efficiency.

Some tackle shops have large machines for loading reels with fishing line but these complex, bulky machines cannot be reasonably brought onto a boat or along a remote waterway where the angler is fishing to perform the desired task.

Accordingly, there are a number of disadvantages with fishing line dispensing apparatuses and methods for loading line on a reel that can be addressed.

BRIEF SUMMARY

Implementations of the present disclosure solve one or more of the foregoing or other problems in the art with apparatuses, systems, and methods for loading fishing line onto a reel. In particular, one or more implementations can include fishing line dispensing apparatuses with a base operable to hold a spool of fishing line, a cap detachably associated with at least a portion of the base, and one or more securing elements coupled to the base. The securing elements can be operable to releasably secure the base to a shaft of a fishing rod. Additionally, fishing line dispensing apparatuses can include a spool retention surface disposed at a bottom end of the base and a sidewall connected to and extending in a substantially orthogonal direction away from the spool retention surface.

Implementations of the present disclosure additionally provide kits for loading fishing line onto a reel. A kit for loading fishing line onto a reel can include a spool of fishing line and a fishing line dispensing apparatus. The fishing line dispensing apparatus can include a base operable to hold the spool of fishing line, the base comprising a circular spool retention surface disposed at a bottom end of the base and an arcuate sidewall connected to and extending away from the circular spool retention surface. The circular spool retention surface and the arcuate sidewall can form a cylindrical inner portion of the base. The kit can additionally include a cap configured to detachably associate with an upper end of the base and a plurality of securing elements coupled to the sidewall of the base and operable to releasably secure the base to a shaft of a fishing rod.

Accordingly, fishing line dispensing apparatuses and kits for the same are disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. In the drawings, multiple instances of an element may each include separate letters appended to the element number. For example, two instances of a particular element "100" may be labeled as "100*a*" and "100*b*." In that case, the element label may be used without an appended letter (e.g., "100") to generally refer to every instance of the element, while the element label will include an appended letter (e.g., "100*a*") to refer to a specific instance of the element. The disclosure will be described and explained with additional specificity and detail through the use of the accompanying drawings in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments, and is not necessarily intended to limit the scope of the claimed invention.

As provided above, there are a number of disadvantages associated with systems, apparatuses, and methods for loading line onto a fishing reel that can be addressed. For example, it is often difficult to properly load fishing line onto a fishing reel by oneself and/or while on location fishing. Further, there are no lightweight, portable, and/or easy-to-use fishing line dispensing devices that have a relatively small storage footprint and which can be easily transported, if desired, with an angler to a remote fishing location.

Embodiments of the present disclosure include small, portable, and hands-free fishing line dispensing devices operable to hold and dispense fishing line onto a destination reel. In some embodiments, the fishing line dispensing device includes a base that is sized and shaped to hold a spool of fishing line and a complementary cap for retaining the spool of fishing line at the base. The base is sufficiently sized such that the retained spool can rotate/spin within the base and thereby dispense line even when the complementary cap is coupled to the base. In some embodiments, the base defines an aperture in a sidewall extending substantially orthogonal to a spool retention surface. The aperture acts as a port to allow fishing line to exit an interior portion of the base and access a destination reel.

In some embodiments, the fishing line dispensing device is selectively attached to the shaft of a fishing rod—above the destination reel—by one or more securing elements. The securing elements, in some embodiments, allow the user to quickly and easily position the fishing line dispensing device on the fishing rod such that the user can load the destination reel with fishing line in a hands-free manner and without assistance from another individual. Further, by selectively attaching the fishing line dispensing device to the fishing rod, the supplemental spool of fishing line is contained in a safe location while loading the reel. This prevents, for example, the spool from being damaged or lost during use and further allows the fishing reel to be loaded with fishing line at remote locations and at a user's preference.

Figure 1:
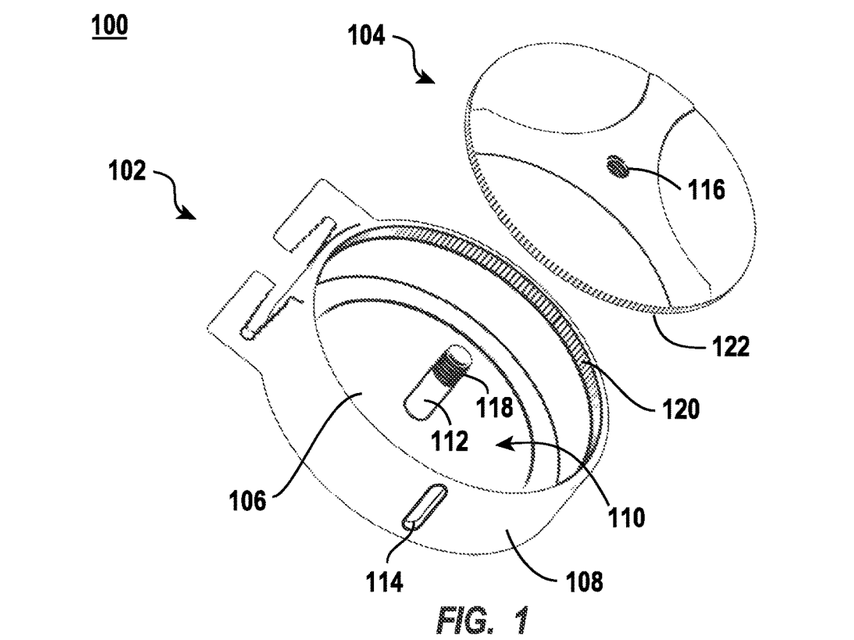
FIG. 1 illustrates a perspective view of a fishing line dispensing device having a cap detached from a corresponding base.

Referring now to FIG. 1, illustrated is a perspective view of a fishing line dispensing device 100 that includes a base 102 and a detachable cap 104. As depicted, the base 102 includes a spool retention surface 106 and a sidewall 108 extending in a substantially orthogonal direction away from the spool retention surface 106. The spool retention surface 106—and to the same or similar degree the sidewall 108—are substantially circular and together define a cylindrical inner portion 110 of the base 102. The base 102 additionally includes a post 112 positioned at or near a center portion of the spool retention surface 106. The post 112 is substantially orthogonal to and extends away from the spool retention surface 106 in the same or similar direction as the sidewall 108.

Many commercial spools of fishing line are similarly cylindrical in shape and often include a central aperture positioned about a rotational axis of the spool. Accordingly, in some embodiments, the cylindrical inner portion 110 is sized and shaped to accommodate one or more different sizes of spools, and the post 112 is sized and shaped to penetrate the central aperture of the spools and, thereby, additionally support the retention of the spool positioned within the cylindrical inner portion 110 of the base 102. Because the post 112, in some embodiments, is disposed along the rotational axis of the spool of fishing line, the spool can rotate about the post 112 when fishing line is retrieved from the spool.

Lateral movement of a spool within the cylindrical inner region 110 can be restricted on a first end by the spool retention surface 106 and on an end opposing the spool retention surface 106 by the selective attachment of the cap 104 to the base 102. In some embodiments, and as illustrated in FIG. 1, the cap 104 is sized and shaped to fit within an inner circumference of the substantially circular sidewall 108. Accordingly, when the cap 104 is associated with the base 102, it snugly fits within the inner circumference of the sidewall 108.

Figure 2:
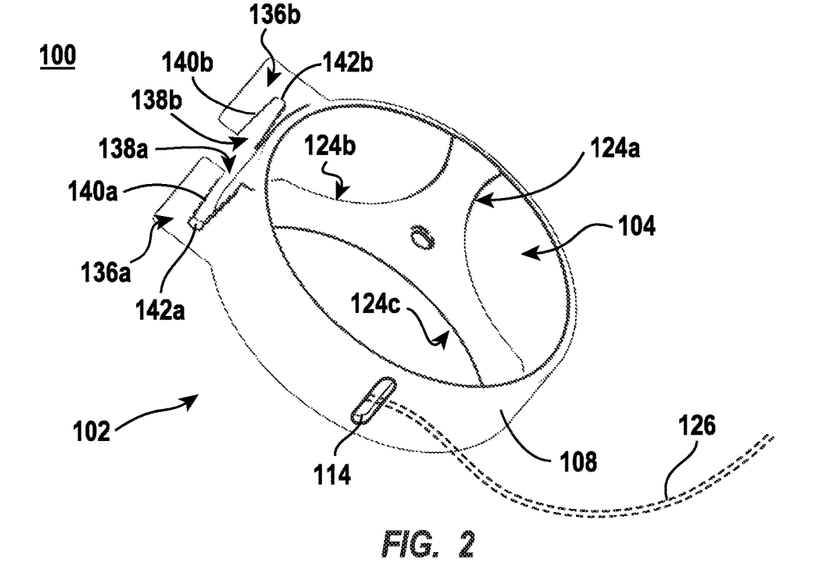
FIG. 2 illustrates a perspective view of an assembled fishing line dispensing device.

The cap 104 and the base 102 can be selectively attached to each other using a cap attachment mechanism. As depicted in FIG. 1, the cap attachment mechanism includes a threaded aperture 116 located on the cap 104 that aligns with and mates to a complementary threaded upper region 118 of the post 112 when the cap is associated with the base 102 (as shown in FIG. 2). For example, a user can attach the cap 104 to the base 102 by aligning the threaded aperture 116 over the threaded upper region 118 of the post 112 and rotating the cap such that the complementary threads engage and thereby advance the cap 104 into tighter association with the base 102.

The threaded attachment mechanism of FIG. 1 is illustrated as having right-handed threads. Accordingly, a clockwise rotation of the cap 104 tightens the association of cap 104 with the base 102 and a counterclockwise rotation of the cap 104 loosens the association of cap 104 with the base 102. It should be appreciated that a spool of fishing line can be loaded into the base in one of two ways: it can either be loaded such that it rotates in a clockwise direction when fishing line is retrieved therefrom, or it can be loaded such that it rotates in a counterclockwise direction when fishing line is retrieved therefrom. Depending on one or more factors, such as the thread pitch and/or the number of threads associated with a threaded attachment mechanism, a counterclockwise rotation of the spool within the cylindrical inner portion can cause a cap with a right-handed threaded aperture to loosen. Similarly, a clockwise rotation of the spool can cause a cap with a left-handed threaded aperture to loosen.

Regardless of the handedness of the threads, in some embodiments—including that depicted in FIG. 1—an upper portion of the sidewall 108 includes a locking band 120. The locking band 120 includes a plurality of evenly or unevenly spaced ridges of the same or different height. The cap 104 additionally includes a circumferential edge 122 having a plurality of ridges that are sized and shaped to mechanically interfere with the corresponding locking band 120 when the cap 104 is attached to the base 102. The interlocking ridges of the locking band 120 and the circumferential edge 122 of the cap 104 can act to prevent the cap 104 from loosening as a result of a spool rotating inside the base. If the spool rotes counterclockwise, the interlocking ridges prevent a sympathetic counterclockwise rotation of the cap 104, and similarly, if the spool rotates clockwise, the interlocking ridges prevent a sympathetic clockwise rotation of the cap 104. In such embodiments, the association of the cap 104 with the base 102 is maintained despite rotation of a spool within the base 102.

As perhaps better illustrated in FIG. 2, attachment of the cap 104 to the base 102 causes the circumferential edge 122 of the cap 104 to be recessed within at least an upper portion of the sidewall 108. Engagement of the ridges associated with the circumferential edge and a locking band can result in frictional interference between the two elements, which can make it intentionally difficult to loosen the cap 104 from the base 102 once attached thereto. To assist a user in applying additional force or to more easily engage the cap 104, gripping regions 124a, 124b, 124c can be provided on a top surface of the cap 104. Although depicted as three gripping regions, in some embodiments, there are two gripping regions, four gripping regions, five gripping regions, six gripping regions, seven gripping regions, eight gripping regions, nine gripping regions, or more. Additionally, or alternatively, the gripping regions can be disposed in any shape, grouping, and/or location on the top surface of the cap 104 that allows a user to better handle and/or grip the cap 104.

As provided above, the gripping regions 124a, 124b, 124c on the cap 104 can assist the user to, for example, rotate the circumferential edge 122 of the cap 104 into and/or out of a locking position within locking band 120. In some embodiments, the locking band 120 comprises the entire interior surface of the sidewall 108 or a substantial portion of the interior surface of the sidewall 108. In some embodiments, the locking band 120 extends from a top edge of the sidewall 108 down a portion of the sidewall 108 to the same extent/depth within the cylindrical inner portion as the threads associated with the upper region 118 of the post 112. In such an embodiment, the locking band 120 can engage the circumferential edge 122 of the cap 104 at any position along the threaded post 112.

While the attachment mechanism is depicted in FIGS. 1 and 2 as being a pair of complementary mating threads, the attachment mechanism can alternatively include a frictional/interference fit between the cap and the post or between a circumferential edge of the cap and a corresponding lip or edge of the sidewall such that the cap snaps onto the base and is held thereon by a frictional/interference fit. In an embodiment where a frictional/interference fit is used to attach the base and the cap, a locking band may not be provided on the sidewall of the base.

In some embodiments, the base is sized and shaped to accommodate a standard filler spool (e.g., a spool of fishing line containing between about 100-400 yards of fishing line and having a diameter of about four inches and a width of about one inch). In some embodiments, the base is sized and shaped to accommodate the quarter spool (e.g., a spool of fishing line containing between about 200-2000 yards of fishing line and having a diameter between about four to five inches and a width of between about one to three inches). Additionally, or alternatively, the base is sized and shaped to accommodate a bulk spool (e.g., a spool of fishing line containing between about 2000-7500 yards of fishing line and having a diameter of about four to six inches and a width of between about three to six inches). In some embodiments, the base is sized and shaped to accommodate one or more spools of fishing line of the same or varying sizes.

Referring again to FIG. 2, when a spool of fishing line is positioned within the base, the fishing line 126 can be fed through an aperture 114 defined by the sidewall 108. In some embodiments, the aperture 114 has smooth edges so as to not fray or cut the line 126 extending therethrough. Additionally, or alternatively, the aperture 114 can include a rubber or silicone insert that, itself, has an aperture through which the fishing line 126 is passed. Such a rubber or silicone insert can be advantageous as it can act to hold the line 126 taut while it is being transferred between the fishing line dispensing device 100 and the destination reel. This may help to properly load the destination reel and avoid potential twists and/or tangles in the line 126.

Figure 3A:
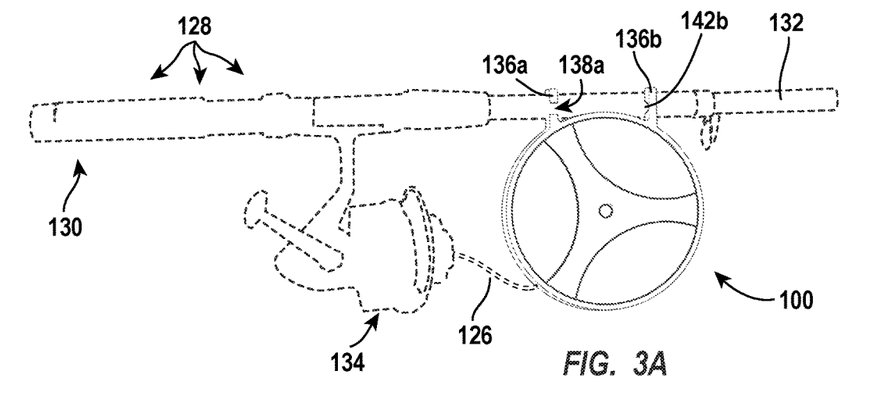
FIG. 3A illustrates the fishing line dispensing device of FIG. 2 associated with the shaft of a fishing rod in an embodiment for loading a fishing reel with fishing line housed within the depicted fishing line dispensing device.

The fishing line dispensing device 100 of FIG. 2 can be selectively attached to a fishing rod 128, as illustrated in FIG. 3A. In some embodiments, the fishing line dispensing device 100 is preferably placed above the butt 130 of the fishing rod 128 and attached to a portion of the shaft 132 above the destination reel 134. In the foregoing preferable configuration, among other embodiments, the fishing line 126 has a substantially linear path between the fishing line dispensing device 100 and the destination reel 134.

The fishing line dispensing device 100 is operable to attach to the shaft 132 of a fishing rod 128 using one or more securing elements 136a, 136b, shown in FIGS. 2 and 3A. Each of the one or more securing elements 136a, 136b includes an opening 138a, 138b, gauged ribs 140a, 140b and an arcuate terminus 142a, 142b. As depicted in FIG. 2, the securing elements 136a, 136b are substantially similar in size and shape but are oriented in opposite directions. That is, the securing element 136a is oriented with the opening 138a proximate the cap 104 and with the arcuate terminus 142a proximate the spool retention surface 106. Conversely, the securing element 136b is oriented with the opening 138b proximate the spool retention surface 106 and with the arcuate terminus 142b proximate the cap 104. This may, for example, increase the ease by which the fishing line dispensing device 100 is attached to the fishing rod 128. In some other embodiments, the securing elements are oriented in substantially the same direction (i.e., the openings are proximate the same side of the base and the arcuate terminuses are proximate the opposing side of the base).

The gauge ribs 140a, 140b begin with a larger diameter gauge proximate the opening 138a, 138b and decrease in size to smaller diameter gauges, culminating in the arcuate terminus 142a, 142b, which is the smallest diameter gauge of the gauged ribs 140a, 140b. As is known in the art, fishing rods are generally tapered in diameter from the butt end to the tip. The starting and/or ending diameter of the rod, in addition to the degree of taper, can depend on many things, such as the length, power, and/or action of the rod. Accordingly, the gauged ribs 140a, 140b may snugly fit with different portions of the shaft (e.g., different thicknesses of the shaft) on different fishing rods. Nevertheless, the gauged ribs 140a, 140b are configured in size and shape to fit at least a portion of the shaft. For example, the smaller gauged ribs may fit with smaller diameter portions of the rod typically associated with the distal end of the shaft, whereas larger gauged ribs may fit with larger diameter portions of the rod typically associated with the proximal end of the shaft, above the butt and/or reel seat.

Once the fishing line dispensing device 100 is attached to the shaft 132 of the fishing rod 128, the fishing line 126 can be attached to or otherwise associated with the destination reel 134, and as depicted in FIG. 3A, a spool of fishing line contained within the fishing line dispensing device 100 can rotate in a plane that is generally aligned with, parallel to, or transverse to the shaft 132 when the line 126 is being dispensed from the fishing line dispensing device 100 to the destination reel 134.

Figure 3B:
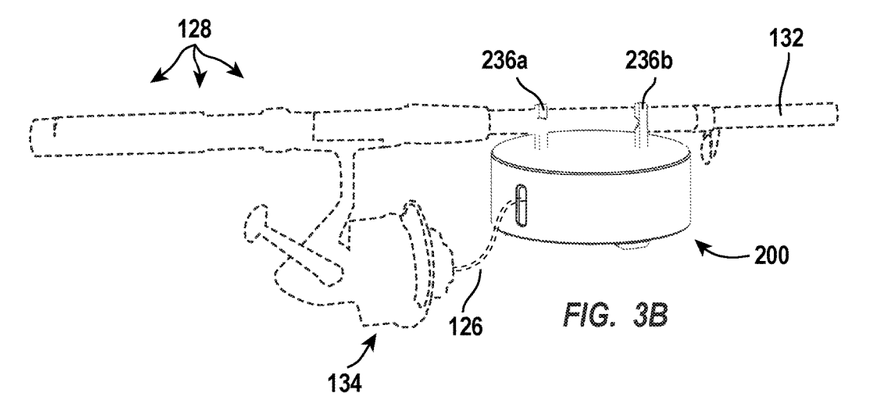
FIG. 3B illustrates another embodiment of a fishing line dispensing device associated with the shaft of a fishing rod for loading a fishing reel with fishing line housed within the depicted fishing line dispensing device.

Referring now to FIG. 3B, fishing line dispensing device 200 can be attached to the shaft 132 of fishing rod 128 by securing elements 236a, 236b in the same or in a substantially similar manner as disclosed above with respect to fishing line dispensing device 100 of FIG. 3A. However, the securing elements 236a, 236b are coupled to or extend from a bottom side of base 202 instead of to the sidewall, which orients the fishing line dispensing device 200 in a substantially different plane than fishing line dispensing device 100 of FIG. 3A. Accordingly, the spool of fishing line contained within the fishing line dispensing device 200 can rotate in a plane parallel to the shaft 132 when the line 126 is being dispensed from the fishing line dispensing device 200 to the destination reel 134.

Figure 4:
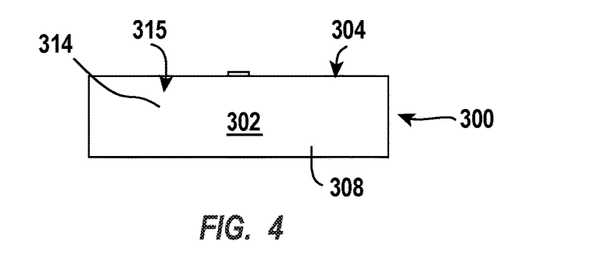
FIG. 4 illustrates a side view of a fishing line dispensing device having a base defining and open-ended aperture.

Referring now to FIG. 4, illustrated is a fishing line dispensing device 300 having a base 302 and a sidewall 308. As depicted, the sidewall 308 defines at least three sides of an open-sided aperture 314. An open side 315 of the aperture 314 is not defined by the side wall 308. Rather, the open side 315 is defined by the cap 304 when it is associated with base 302. In some embodiments, an open-sided aperture is advantageous because it requires less dexterity to feed the fishing line through the aperture. For example, in embodiments comprising an open-sided aperture, a spool of fishing line can be placed within the base and the fishing line can be drawn over the open side and into the aperture. The fishing line can then be retained within the aperture by sealing the open side through attachment of the cap to the base.

In the foregoing example, the user is never required to release the fishing line when placing it into the aperture. On the other hand, an aperture bounded on all sides by the sidewall requires the user to precisely feed the fishing line through the aperture and often entails the user grasping the fishing line on the receiving end after it has passed through the aperture. In some instances, this maneuver calls for the user to release the line with one hand while grasping it with the other—a feat of increased dexterity over placement of fishing line through an open-sided aperture.

Figure 5A:
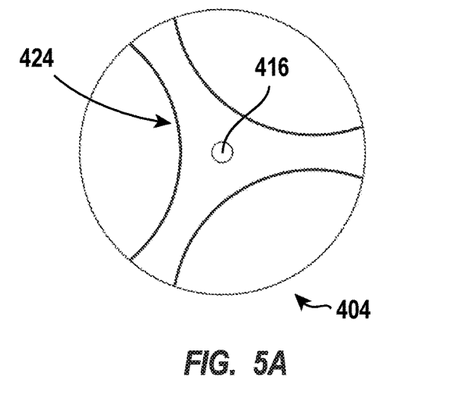
FIG. 5A illustrates a top view of an exemplary cap having a plurality of gripping regions disposed on a surface thereof.

Referring now to FIG. 5A, illustrated is a cap 404 having a central aperture 416 for attachment to a complementary base (e.g., bases 102, 302), and is similar in many respects to the cap 104 illustrated in FIGS. 1, 2, and 3A. For example, cap 404 includes protruded gripping region 424, which is the same or substantially similar to the gripping regions 124a, 124b, 124c described above with respect to FIG. 2.

Figure 5B:
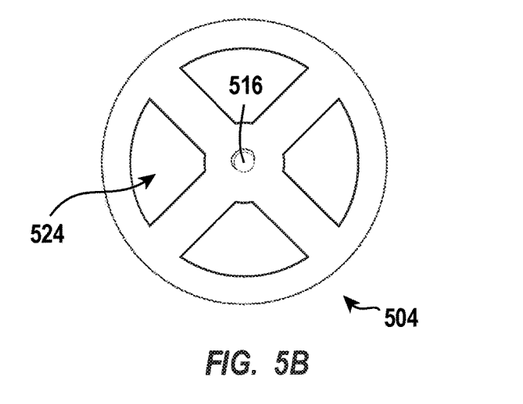
FIG. 5B illustrates a top view of an exemplary cap having a plurality of apertures.

In an alternative embodiment, a cap 504 can include one or more openings 524 in the cap 504, as illustrated in FIG. 5B. The user can place one more digits and/or tools into the openings to grasp the cap 504 to attach and/or remove the cap 504 from an associated base. Although the cap 504 is illustrated as having four symmetric openings, in some embodiments, a cap can include one, two, three, five, six, seven, eight, nine, or more openings and may be sized and/or shaped differently or the same. For example, the cap could include three circular openings sized and shaped to a user's digits, allowing the user to firmly grasp and/or manipulate the cap. Openings in the cap, such as those provided in the foregoing embodiments, can be beneficial for fishing line dispensing devices having frictional fitting or interference fitting attachment mechanism(s) between the base and cap, as they can allow the user to exert a force in a direction away from the base (and thereby remove a frictionally fitting and/or interference fitting cap).

Figure 6:
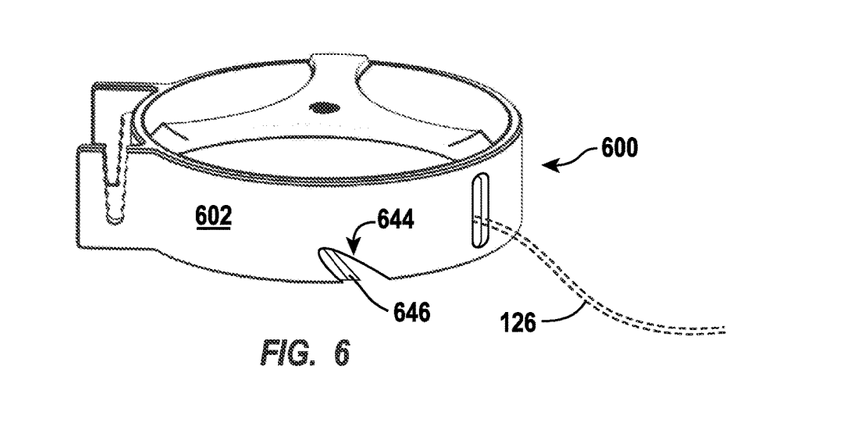
FIG. 6 illustrates a perspective view of an assembled fishing line dispensing device having a cutting device integrated into a base portion thereof.

Referring now to FIG. 6, illustrated is a fishing line dispensing device 600 that is in many respects similar to the fishing line dispensing device 100 illustrated in FIGS. 1, 2, and 3A. The fishing line dispensing device 600 of FIG. 6 is additionally outfitted with a cutting element 646 disposed within a recess 644 of the base 602. In some embodiments, the cutting element 646 can be used to cut the fishing line 126 after the destination reel has been loaded. In some embodiments, the cutting element 646 is made of the same material as the base 602. In an embodiment, the cutting element 646 comprises a metal alloy such as steel.

In some embodiments, the cutting element is detachably associated with the base and can comprise scissors, a knife, or other cutting tool and may be integrally, though detachably, formed into a portion of the fishing line dispensing device. For example, the detachable knife can be integrally, though detachably, associated with the bottom portion of the base such that when it is attached to the base, the knife and the bottom of the base are substantially flush with one another. Additionally, or alternatively, the cutting element can be provided on a least a portion of the circumferential edge of the cap. In such an embodiment, there can be one or more cutting element access points on an upper portion of the sidewall such that when the cutting element is positioned at any of the one or more access points, the cutting element is exposed and can be used to cut the fishing line. Furthermore, additional rotation of the cap past the one or more access points occludes the cutting element and prevents it from unintentionally cutting the fishing line, the user, and/or other objects.

Figure 7:
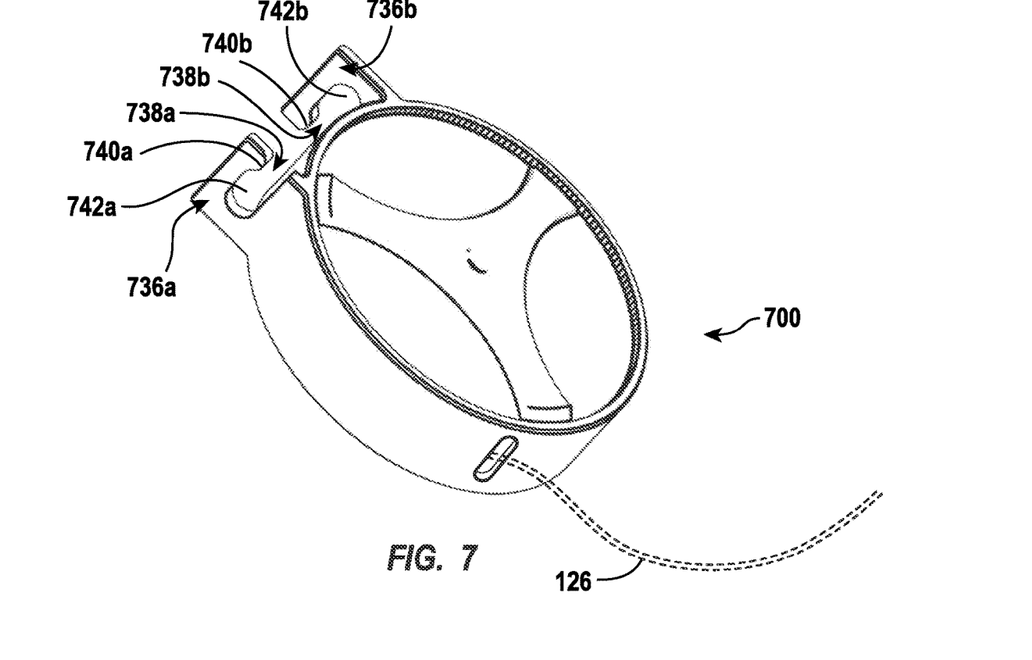
FIG. 7 illustrates a perspective view of an assembled fishing line dispensing device configured with securing elements.

Referring now to FIG. 7, illustrated is a fishing line dispensing device 700 configured with securing elements 736a, 736b sized and shaped as turtle clips. The narrow neck 740a, 740b of opening 738a, 738b followed by a retention space 742a, 742b having a diameter greater than the space between the narrow neck 740a, 740b and an opposing portion of the securing element 736a, 736b imitates the narrow neck and wider head of a turtle. Accordingly, the securing elements 736a, 736b of FIG. 7 may be referred to as "turtle clips." The securing elements 736a, 736b attach to a shaft of a fishing rod in a similar fashion as the securing elements 136a, 136b described above with respect to FIG. 3A. Briefly, a portion of the rod's shaft is held within the retention space 742a, 742b. In one embodiment, the shaft is placed within the retention space 742a, 742b and held therein by first sliding a narrow portion of the shaft into the retention space 742a, 742b. The retention space 742a, 742b can comprise a diameter less than that between the narrow neck 740a, 740b and the opposite side of the securing element 736a, 736b. The fishing line dispensing device 700 can then be moved along the shaft toward a portion of the shaft having a greater diameter than the opening between the narrow neck 740a, 740b and the opposite side of the securing element 736a, 736b.

In some embodiments, securing elements 736a, 736b are rigid, yet semi-flexible and flex outward to permit a larger diameter shaft to enter the retention space 742a, 742b. Regardless of the manner in which the fishing line dispensing device is detachably connected to the fishing rod, the temporary association of a fishing line dispensing device with the fishing rod, at the very least, allows a user an advantageous way to load fishing line onto a destination reel in an easier, more efficient fashion.

The foregoing embodiments are provided merely by way of example. It will be appreciated that these embodiments may be modified without departing from the scoped of the present disclosure. For instance, a fishing line dispensing device may include a base having a post upon which a spool may be rotatably mounted. The post may be connected to one or more securing elements that allow the base to be selectively connected to a fishing rod. In some embodiments, the base includes a sidewall that extends around only a portion of a spool rather than the entire spool. Similarly, the base may include a spool retention surface that is smaller than that shown in the Figures. For instance, the spool retention surface may be disposed adjacent to only a portion of the spool sidewall as opposed to an entire spool sidewall. Similarly, a cap may be smaller than shown. In some embodiments, for instance, the cap may take the form of a nut that can be secured to the post to hold the spool on the post, but which does not cover an entire sidewall of the spool.

Figure 8:
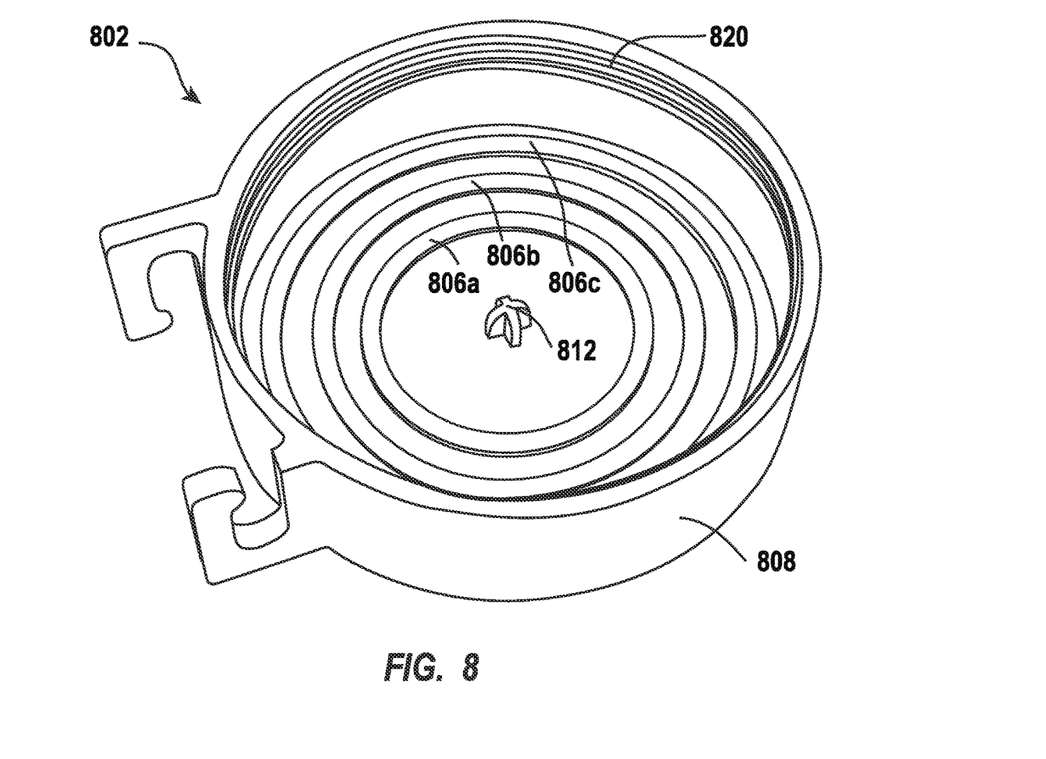
FIG. 8 illustrates a perspective view of an embodiment of a base of a fishing line dispensing device.

Additionally, in some embodiments, the post does not associate with the cap. Rather, the cap and base are detachably associated. For example, as shown in FIG. 8, a base 802 can include a sidewall 808 having a threaded inner portion 820 that mates with a threaded circumferential edge of a complementary cap (not shown). In this way, the base 802 detachably associates directly with the cap (not shown) using complementary threads. Also depicted in FIG. 8, the base 802 includes a post 812 comprising two arcuate planes that are orthogonal to each other. As depicted, the post 812 is disposed within a central region of the base 802 and is sized and shaped to fit within at least a portion of a central aperture of an associated spool. However, the post 812 does not extend to the same height as the sidewall 808.

With continued reference to FIG. 8, the base 802 includes a plurality of spool retention surfaces 806a, 806b, 806c of differing diameters. The different diameter spool retention surfaces 806a, 806b, 806c can, in some embodiments, act as guides for receiving and at least partially retaining differing sized spools. As shown, the spool retention surfaces 806a, 806b, 806c are disposed within the base 802 as concentric rings, and although depicted as substantially proportional and equidistant, in some embodiments, there is a greater distance between one or more spool retention surfaces and/or the spool retention surfaces are not aligned about a central point/axis. Any of a plurality of spool retention surfaces can be included within the base and a size and/or a shape that conforms to a spool to be disposed therein.

Figure 9:
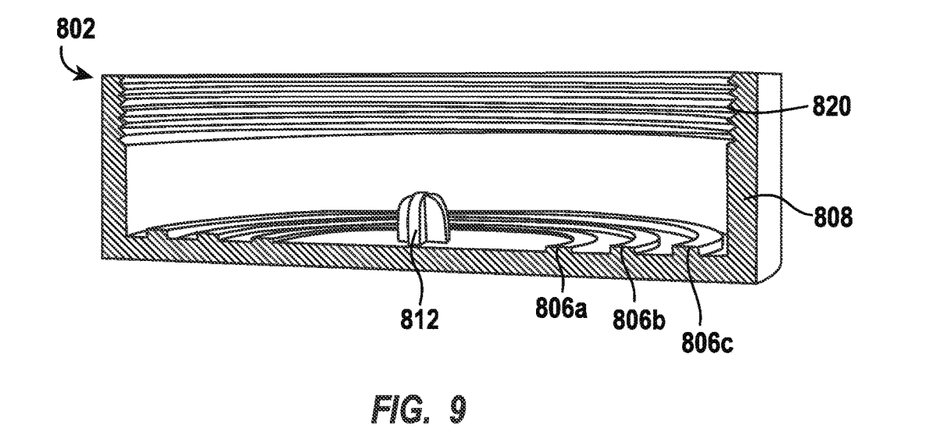
FIG. 9 illustrates a cross-sectional perspective view of the base depicted in FIG. 8.

As perhaps better illustrated in FIG. 9, which illustrates a cross section of the base depicted in FIG. 8, each of the spool retention surfaces 806a, 806b, 806c not only define a circumferential boundary within the base 802, but each successive concentric spool retention surface is raised above the previous spool retention surface. For example, the innermost spool retention surface 806a includes a circular ridge that is raised above the floor of base 802, and the next successive spool retention surface 806b includes a circular rage that is raised above spool retention surface 806a. Further, the outermost spool retention surface 806c includes a circular ridge that is raised above spool retention surface 806b. In some embodiments, the spool rests on one of the spool retention surfaces 806a, 806b, 806c with an outer edge thereof butting against (or retained by) the next largest spool retention surface and/or the sidewall 808, itself. In this manner, the base 802 is configured to retain and/or hold a plurality of different sized spools.

In some embodiments, the base of a fishing line dispensing device can accommodate any number of the spool retention surfaces and can, therefore, be associated with any number of raised ridges. In some embodiments, at least a portion of each successive concentric spool retention surface is elevated above the previous spool retention surface; however, in other embodiments, the height of at least a portion of the spool retention surfaces alternates such that each spool retention surface is bounded on at least one side by an adjacent spool retention surface and/or the sidewall and accommodates a size and shape of a desired spool.

Individual components comprising the disclosed fishing line dispensing devices can include one or more materials. For example, a fishing line dispensing device of the present disclosure can include one or more components made of or including metal alloys or durable plastics. Exemplary durable plastics include polypropylene, polymethylpentene, polycarbonate, and polymethyl methacrylate. In some embodiments, select elements of the fishing line dispensing device are made from a metal alloy, such as steel, surgical stainless steel, tungsten carbide, titanium alloys, or similar. For example, the cutting element may preferably be made from a metal alloy. Components of the fishing line dispensing device can additionally be made of a thermoplastic (e.g., polypropylene, polyethylene, polyvinyl chloride, polycarbonate, etc.), elastomer (e.g., polyisoprene, polybutadiene, nitrile rubbers, polycholorprene, etc.), thermoplastic elastomer (e.g., thermoplastic olefins, thermoplastic polyurethanes, etc.), silicone, or similar. As provided above, an aperture for feeding line from the fishing line dispensing device to the destination reel can include a rubber or silicone insert. In some embodiments, and may be advantageous for one or more securing elements to comprise a semi-rigid, yet flexible material such as one or more of the foregoing elastomers and/or thermoplastic elastomers. The base and/or cap can, alternatively, comprise a harder, rigid material such as one or more of the foregoing thermoplastics, metal alloys, and/or plastics.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A fishing line dispensing apparatus for loading fishing line onto a reel, the fishing line dispensing apparatus comprising:
    a base operable to hold a spool of fishing line, the base comprising:
        a spool retention surface disposed at a bottom end of the base; and
        a sidewall connected to and extending in a substantially orthogonal direction away from the spool retention surface; and
        an aperture at least partially defined by the sidewall, wherein the aperture is configured to allow egress of fishing line from an inner portion of the base, the aperture comprising a rubber or silicone insert having a slit or space, the slit or space being configured to provide tension to the fishing line as it is drawn through the aperture;
    a cap detachably associated with at least a portion of the base; and
    one or more securing elements coupled to the base, the securing elements operable to releasably secure the base to a shaft of a fishing rod.

2. The fishing line dispensing apparatus of claim 1, wherein the base further comprises a plurality of spool retention surfaces disposed at a bottom end of the base that are sized and shaped to retain different diameter spools.

3. A fishing line dispensing apparatus for loading fishing line onto a reel, the fishing line dispensing apparatus comprising:
    a base operable to hold a spool of fishing line;
    a cap detachably associated with at least a portion of the base; and
    one or more securing elements coupled to the base, the securing elements operable to releasably secure the base to a shaft of a fishing rod, wherein each of the one or more securing elements comprises:
        a first interior edge comprising a plurality of gauged ribs; and
        a second interior edge disposed opposite the first interior edge, the second interior edge comprising a plurality of complementary gauged ribs aligned with the plurality of gauged ribs and complementary to the plurality of gauged ribs in size and shape,
        wherein the first interior edge and the second interior edge connect at an arcuate terminus, and
        wherein the first interior edge and the second interior edge extend away from the arcuate terminus toward an opening spanning a space between terminal portions of the first and second interior edges.

4. The fishing line dispensing apparatus of claim 3, wherein the base further comprises:
    a spool retention surface disposed at a bottom end of the base; and
    a sidewall connected to and extending in a substantially orthogonal direction away from the spool retention surface.

5. The fishing line dispensing apparatus of claim 4, further comprising an aperture at least partially defined by the sidewall, wherein the aperture is configured to allow egress of fishing line from an inner portion of the base.

6. The fishing line dispensing apparatus of claim 5, wherein the aperture comprises a rubber or silicone insert having a slit or space, the slit or space being configured to provide tension to the fishing line as it is drawn through the aperture.

7. The fishing line dispensing apparatus of claim 5, wherein the spool retention surface additionally comprises a post positioned at or near a center portion of the spool retention surface, wherein the post is operable to secure at least a portion of the spool of fishing line within the base.

8. The fishing line dispensing apparatus of claim 7, wherein the post comprises an upper region having a first element of an attachment mechanism to detachably connect the cap to the base.

9. The fishing line dispensing apparatus of claim 8, wherein the cap additionally comprises:
    a second element of the attachment mechanism to detachably connect the cap to the base, the second element being complementary to the first element; and
    one or more gripping regions.

10. The fishing line dispensing apparatus of claim 9, additionally comprising:
   a locking band disposed on at least an upper portion of an inside surface of the sidewall; and
   a circumferential edge of the cap configured to engage at least a portion of the locking band when the cap is detachably associated with the base.

11. The fishing line dispensing apparatus of claim 3, wherein the plurality of gauged ribs and the plurality of complementary gauged ribs decrease in size from the opening to the arcuate terminus.

12. The fishing line dispensing apparatus of claim 3, wherein at least the first interior edge comprises a semi-flexible material configured to flex in response to an outward pressure.

13. A fishing line dispensing apparatus for loading fishing line onto a reel, the fishing line dispensing apparatus comprising:
   a base operable to hold a spool of fishing line, the base comprising:
      a recess formed into the base; and
      a cutting element disposed within the recess;
   a cap detachably associated with at least a portion of the base; and
   one or more securing elements coupled to the base, the securing elements operable to releasably secure the base to a shaft of a fishing rod.

14. The fishing line dispensing apparatus of claim 13, wherein the base further comprises:
   a spool retention surface; and
   a sidewall connected to and extending in a substantially orthogonal direction away from the spool retention surface, wherein the sidewall contains at least a portion of the recess.

15. The fishing line dispensing apparatus of claim 14, wherein the sidewall comprises a material selected from one or more of polypropylene, polyethylene, polyvinyl chloride, or polycarbonate and the cutting element is made of a metal alloy.

16. A fishing line dispensing apparatus for loading fishing line onto a reel, the fishing line dispensing apparatus comprising:
   a base operable to hold a spool of fishing line, the base comprising:
      a spool retention surface disposed at a bottom end of the base; and
      an arcuate sidewall connected to and extending away from the spool retention surface;
   a cap configured to detachably associate with an upper end of the base; and
   a plurality of securing elements coupled to the sidewall and operable to releasably secure the base to a shaft of a fishing rod, wherein each of the plurality of securing elements comprises:
      a first interior edge comprising a plurality of gauged ribs; and
      a second interior edge disposed opposite the first interior edge, the second interior edge comprising a plurality of complementary gauged ribs aligned with the plurality of gauged ribs and complementary to the plurality of gauged ribs in size and shape, wherein the size and shape correspond to one or more portions of the shaft of the fishing rod.

17. A fishing line dispensing apparatus for loading fishing line onto a reel, the fishing line dispensing apparatus comprising:
   a base operable to hold a spool of fishing line, the base comprising:
      a spool retention surface disposed at a bottom end of the base;
      an arcuate sidewall connected to and extending away from the spool retention surface; and
      a recess formed into the base and a cutting element disposed within the recess
   a cap configured to detachably associate with an upper end of the base; and
   a plurality of securing elements coupled to the sidewall and operable to releasably secure the base to a shaft of a fishing rod.

18. The fishing line dispensing apparatus of claim 17, wherein each of the plurality of securing elements comprises:
   a first interior edge comprising a plurality of gauged ribs; and
   a second interior edge disposed opposite the first interior edge, the second interior edge comprising a plurality of complementary gauged ribs aligned with the plurality of gauged ribs and complementary to the plurality of gauged ribs in size and shape, wherein the size and shape correspond to one or more portions of the shaft of the fishing rod.

19. The fishing line dispensing apparatus as in claim 17, wherein each of the plurality of securing elements comprises:
   a first interior edge comprising a plurality of gauged ribs; and
   a second interior edge disposed opposite the first interior edge, the second interior edge comprising a plurality of complementary gauged ribs aligned with the plurality of gauged ribs and complementary to the plurality of gauged ribs in size and shape, wherein the size and shape correspond to one or more portions of the shaft of the fishing rod.

20. A kit for loading fishing line onto a reel, comprising:
   a spool of fishing line; and
   a fishing line dispensing apparatus, comprising:
      a base operable to hold the spool of fishing line, the base comprising a spool retention surface disposed at a bottom end of the base, and an arcuate sidewall connected to and extending away from the spool retention surface;
      a cap configured to detachably associate with an upper end of the base; and
      a plurality of securing elements coupled to the sidewall and operable to releasably secure the base to a shaft of a fishing rod, wherein each of the plurality of securing elements comprises:
         a first interior edge comprising a plurality of gauged ribs; and
         a second interior edge disposed opposite the first interior edge, the second interior edge comprising a plurality of complementary gauged ribs aligned with the plurality of gauged ribs and complementary to the plurality of gauged ribs in size and shape, wherein the size and shape correspond to one or more portions of the shaft of the fishing rod.

* * * * *